United States Patent [19]
Marks et al.

[11] Patent Number: 5,790,775
[45] Date of Patent: Aug. 4, 1998

[54] HOST TRANSPARENT STORAGE CONTROLLER FAILOVER/FAILBACK OF SCSI TARGETS AND ASSOCIATED UNITS

[75] Inventors: Randal S. Marks; Randy L. Roberson; Diana Shen, all of Colorado Springs; Stephen J. Sicola, Monument, all of Colo.

[73] Assignee: Digital Equipment Corporation, Maynard, Mass.

[21] Appl. No.: 546,804

[22] Filed: Oct. 23, 1995

[51] Int. Cl.⁶ .................................................. G06F 11/20
[52] U.S. Cl. ............................. 395/182.07; 395/182.05
[58] Field of Search ........................ 395/182.07, 182.05, 395/470, 183.04, 182.04; 733/135

[56] References Cited

U.S. PATENT DOCUMENTS

| | | | |
|---|---|---|---|
| 4,589,063 | 5/1986 | Shah et al. | 364/200 |
| 5,155,845 | 10/1992 | Beal et al. | 395/575 |
| 5,274,645 | 12/1993 | Idleman et al. | 371/10.1 |
| 5,276,864 | 1/1994 | Hrnandez et al. | 395/182.08 |
| 5,319,754 | 6/1994 | Meinecke et al. | 395/324 |
| 5,390,187 | 2/1995 | Stallmo | 395/182.05 |
| 5,412,661 | 5/1995 | Hao et al. | 395/182.04 |
| 5,471,636 | 11/1995 | Hauck | 395/800 |
| 5,546,535 | 8/1996 | Stallmo et al. | 395/182.07 |
| 5,561,783 | 10/1996 | Vanka et al. | 395/468 |
| 5,581,740 | 12/1996 | Jones | 395/500 |
| 5,586,302 | 12/1996 | Keener et al. | 395/481 |
| 5,588,111 | 12/1996 | Cutts, Jr. et al. | 395/182.07 |

*Primary Examiner*—Robert W. Beausoliel, Jr.
*Assistant Examiner*—Scott T. Baderman
*Attorney, Agent, or Firm*—Cathy L. Peterson; Ronald C. Hudgens

[57] ABSTRACT

Provided herein is a method and apparatus for host transparent storage controller failover and failback. A controller is capable of assuming the identity of a failed controller while continuing to respond to its own SCSI ID or IDs in such a way that all SCSI IDs and associated units (LUNS) of the failed controller are effectively taken over by the surviving controller. This "failover" behavior is transparent to any attached host computers and is treated by such attached hosts as a powerfail condition. The symmetric operation of returning the targets (IDs) and units (LUNs) to the previously failing controller ("failback") is likewise transparent.

4 Claims, 9 Drawing Sheets

HOST TRANSPARENT STORAGE CONTROLLER FAILOVER/FAILBACK OF SCSI TARGETS AND ASSOCIATED UNITS

FIELD OF THE INVENTION

The present invention relates generally to computer data storage systems. Specifically, the invention is directed to fault tolerant storage controllers operating in the Small Computer System Interface (SCSI) environment.

BACKGROUND OF THE INVENTION

Storage controllers are commonly utilized in computer systems to off-load from the host computer certain lower level processing functions relating to I/O operations, and to serve as interface between the host computer and the physical storage media. Given the critical role played by the storage controller with respect to computer system.I/O performance, the potential for interrupted I/O service due to storage controller malfunction must be somehow minimized.

Thus, prior workers in the art have developed various system design approaches in an attempt to achieve some degree of fault tolerance in the storage control function. One such prior approach requires that all system functions be "mirrored". While this type of approach is most effective in reducing interruption of I/O operations and lends itself to value-added fault isolation techniques, it is extremely costly to implement and places a heavy processing burden on the host computer.

Another approach known to the inventors hereof relies on the use of replicated hardware in combination with a dual copy feature to achieve fault tolerance. U.S. Pat. No. 5,155,845 of Oct. 13, 1992, to Beal et al. (Beal) describes such a system. The system disclosed in Beal includes a pair of storage controllers, each capable of communicating with the other and having exclusive access to and control over a particular group of storage devices. During each write operation, the controller receiving the data from the host communicates with the other controller, causing the other and its attached devices to make a duplicate copy of that data. When one controller fails, the host computer must detect its inoperable condition, typically via timing out commands to the controller, and re-direct any outstanding host communication targeted to the failed controller to the other controller.

There are several disadvantages associated with a dual copy mechanism, such as the one described in Beal. Although it does not burden the host computer to the extent of the completely mirrored design, the dual copy function shifts the responsibility for performing the redundancy-related write operations to the storage controllers themselves and thus impacts performance at the controller level. Further, available storage space is not utilized to its full extent.

Yet another approach to storage controller fault tolerance is based on the process of failover. Failover is known in the art as a process by which a first storage controller, coupled to a second controller, assumes the responsibilities of the second controller when the second controller fails. Failback is the reverse operation, wherein the second controller, having been either repaired or replaced, recovers control over its attached storage devices. Since each controller is capable of accessing the storage devices attached to the other controller as a result of the failover, there is no need to store and maintain a duplicate copy of the data—one set stored on the first controller's attached devices and a second (redundant) copy on the second controller's devices—as required in Beal.

One prior advance in the art achieves failover through the use of two controllers coupled in an active/passive configuration. During failover, the passive controller takes over for the active (failing) controller. The drawback to this type of dual configuration is that it cannot support load balancing, as only one controller is active and thus utilized at any given time, to increase overall system performance. Additionally, it is an inefficient use of system resources.

U.S. Pat. No. 5,274,645 of Dec. 28, 1993, to Idleman et al. (Idleman) discloses a dual-active configuration of storage controllers capable of performing failover without the direct involvement of the host.

However, the direction taken by Idleman requires a multi-level storage controller implementation. Each controller in the dual-redundant pair includes a two-level hierarchy of controllers. When the first level or host-interface controller of the first controller detects the failure of the second level or device interface controller of the second controller, it re-configures the data path such that the data is directed to the functioning second level controller of the second controller. In conjunction, a switching circuit re-configures the controller-device interconnections, thereby permitting the host to access the storage devices originally connected to the failed second level controller through the operating second level controller of the second controller. Thus, the presence of the first level controllers serves to isolate the host computer from the failover operation, but this isolation is obtained at added controller cost and complexity.

Other known failover techniques, based on such proprietary buses as Digital Storage System Interconnect ("DSSI") and Computer Interconnect ("CI") from Digital Equipment Corporation, utilize existing host interconnect "handshaking" protocols, whereby the host and controller act in cooperative effort to effect a failover operation. Unfortunately, the "hooks" for this and other types of host-assisted failover mechanisms are currently lacking in more recently developed, industry-standard interconnects, such as SCSI, which were not originally developed with failover capability in mind. Consequently, support for dual-active failover must be built into the host firmware via the host device drivers. Because SCSI is a popular industry standard interconnect and there is a commercial need to support off-base platforms, compatibility is essential. Thus, a vendor-unique device driver in the host is not a desirable option.

Related copending U.S. application Ser. No. 08/071,710, in the name of Sicola et al., in contrast to Idleman, describes a dual-active, redundant storage controller configuration in which each storage controller communicates directly with the host and its own attached devices, the access of which is shared with the other controller. Thus, a failover operation may be executed by one of the storage controllers without the assistance of an intermediary controller and without the physical reconfiguration of the data path at the device interface. Not specifically addressed is the nature of the host's involvement in such an operation.

Therefore, there is a clearly felt need in the art for a dual-active arrangement of storage controllers capable of supporting a failover mechanism which operates in a host-transparent manner. The noted deficiencies in the prior art are overcome by the present invention as described below.

SUMMARY OF THE INVENTION

Accordingly, it is an object of the present invention to provide a fault tolerant system having storage controller failover and failback support for increased data availability, It is another object of the present invention to provide a fault tolerant system in which the host interface has "open systems" capabilities.

It is yet another object of the present invention to provide a fault tolerant system having storage controllers in dual-active configuration, capable of supporting load balancing for increased system performance.

In accordance with the purposes of the invention, as embodied and described herein, the above and other objectives are attained by a system comprising a host CPU, a pair of storage controllers in a dual-active, redundant configuration, and a physical storage media. The pair of storage controllers reside on a common host side SCSI bus, which serves to couple each controller to the host CPU. Each controller is configured by a system user to service zero or more, preferred host side SCSI IDs, each host side ID associating the controller with one or more units located thereon and used by the host CPU to identify the controller when accessing one of the associated units. If one of the storage controllers in the dual-active, redundant configuration fails, the surviving one of the storage controllers automatically assumes control of all of the host side SCSI IDs and subsequently responds to any host requests directed to the preferred, host side SCSI IDS and associated units of the failed controller. When the surviving controller senses the return of the other controller, it releases to the returning other controller control of the preferred, SCSI IDS of the failed controller.

In another aspect of the present invention, the failover is made to appear to the host CPU as simply a re-initialization of the failed controller. Consequently, all transfers outstanding are retried by the host CPU after time outs have occurred.

The host transparent failover scheme of the present invention offers several advantages. The failover operation provides increased data availability without sacrifice to open systems compatibility, since the failover operation is executed in a manner which does not require support in the host CPU. Moreover, the configuration is dual-active. Therefore, host requests may be processed with a high degree of parallelism and I/O performance is thus greatly enhanced. Although this dual-active characteristic disappears during failover, the controllers return to dual-active configuration through the automatic execution of the failback operation immediately upon return of the failed controller. Lastly, the present invention causes the failover operation to look like a controller has just re-initialized, with all outstanding host transfers being subsequently reissued by the host CPU. Thus, no data is lost during the procedure.

BRIEF DESCRIPTION OF THE DRAWINGS

The above objects, features and advantages of the present invention will become more apparent from the following detailed description taken in conjunction with the accompanying drawings, in which.

DESCRIPTION OF THE PREFERRED EMBODIMENT

Figure 1:
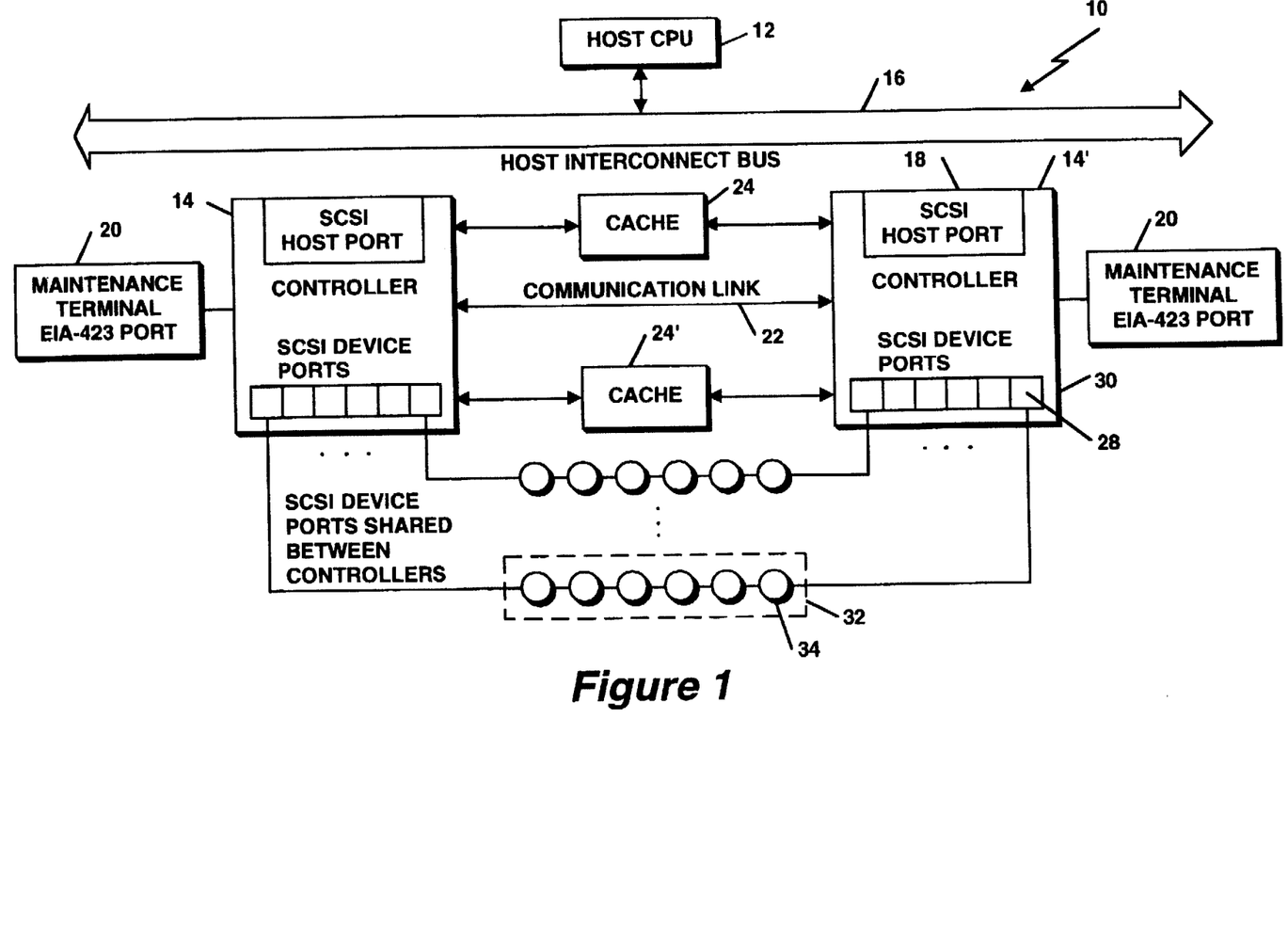
FIG. 1 is a general block diagram of a computer system utilizing a pair of storage controllers in dual-active, redundant configuration in accordance with the principles of the present invention.

With reference to FIG. 1, there is illustrated a computer system 10 having a host CPU 12 coupled to storage controllers 14, 14' (referred to singularly as simply "14") via a host interconnect bus 16. In the preferred embodiment, the host interconnect bus 16 is a "host side" SCSI bus and the storage controllers 14, 14', each having a host port or host interface 18 (shown as a SCSI host port) connected to the same SCSI bus (i.e., the host side SCSI bus 16), operate as a dual-active, redundant pair in accordance with the present invention. Because the SCSI bus is an industry standard bus, the host CPU can be any SCSI-compliant host computer. Connected to each controller is a maintenance terminal 20, a user interface which allows for user directed controller management and status reporting. Further included in the computer system 10 is a communication link 22, which provides a communications path between the controllers 14, 14'. Thus, the controllers 14, 14' use the communication link 22 to share configuration and status information. Caches 24, 24' are attached to the controllers 14, 14' for performance purposes, cache 24 being used by controller 14 and cache 24' being used by controller 14', respectively. Although each cache is primarily associated with only one of the controllers as thus described, it may be accessed directly by the other controller under certain circumstances. The host CPU 12 communicates through each storage controller 14 to one or more "device side" SCSI buses 26. Each device side SCSI bus 26 is connected to a different one of device ports 28 in a device interface 30 on each of the controllers.

The SCSI bus permits data transfer to/from any connected SCSI I/O device. According to the SCSI-2 standard, a SCSI-2 compliant bus has signal lines that include eight data bits DB(0) through DB(7). The standard allows a maximum total of eight devices to be interconnected on the SCSI-2 bus at any one time because each SCSI-2 device is assigned one bit in an eight bit SCSI-2 data byte comprising DB(0) through DB(7) as an address. Device address ID#0 corresponds to DB(0), for example, and device address ID#7 corresponds to DB(7). Such an addressing scheme is known in the art as "logical addressing". The SCSI-2 and -3 standard specifications provide for a 2 byte "wide" bus, which can support up to sixteen devices and device addresses. In the preferred embodiment, the host side SCSI bus 14 is a fast-wide, differential SCSI-2 bus and the device side SCSI bus 20 is an 8-bit, single-ended SCSI-2 bus; however, the applicability of the present invention need not be so limited. It can be extended to both present and future variations of the SCSI bus, and possibly other buses having "SCSI-like" protocols. More detailed information on the characteristics and operation of the SCSI bus may be had with reference to ANSI documents X3.131-1986, X3.131-1992 and X3.131-1994 (Global Engineering Documents, Irvine, Calif.).

Returning to FIG. 1, physical storage media 32, which is comprised of SCSI I/O devices 34, is interconnected to each controller 14 on the device side SCSI bus 26. Each is identified by a SCSI bus address, physically implemented in the device by switches on the device or by suitable jumper connections programming default bus address information in the form of binary address for the device. The SCSI I/O devices 34 in the preferred embodiment shown in FIG. 1 are disk drives, but the principles of the present invention may be extended to systems utilizing other SCSI compatible peripherals and I/O devices.

Figure 2:
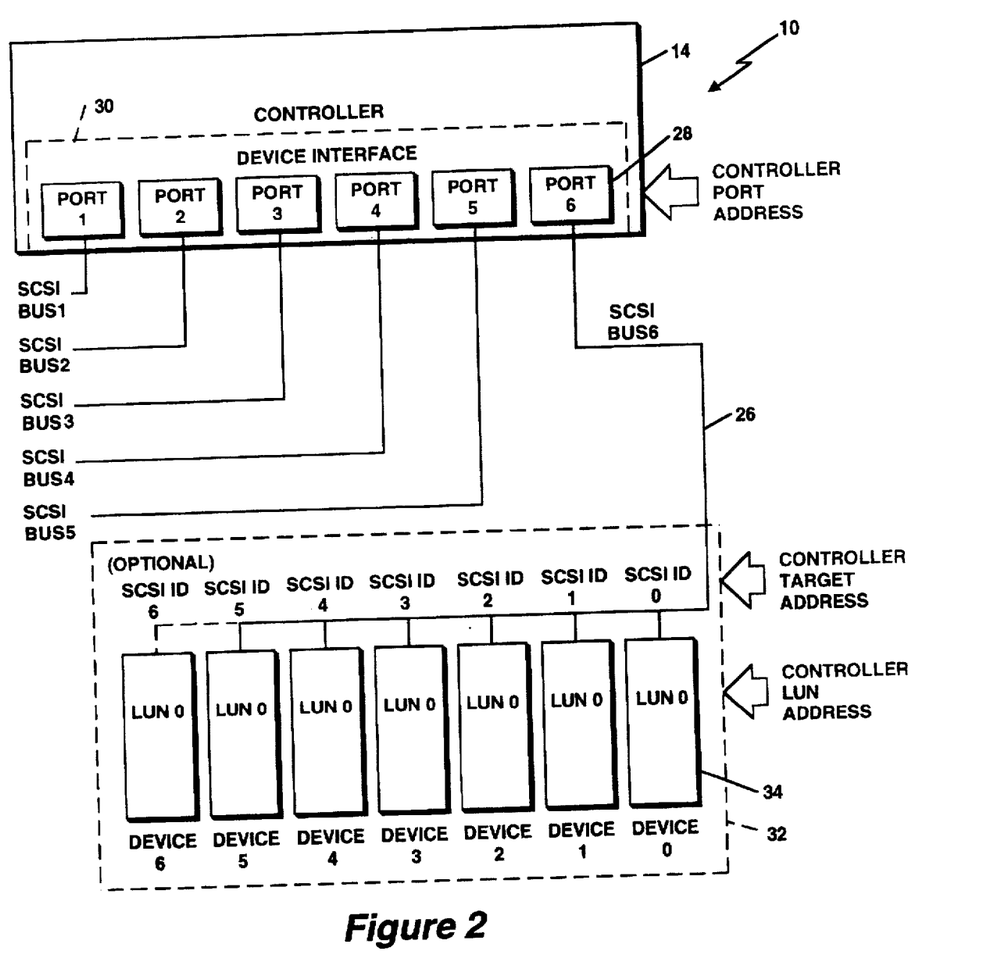
FIG. 2 is a block diagram illustrating storage device addressing from the perspective of an individual one of the storage controllers shown in dual-active, redundant configuration in FIG. 1.

Controller storage addressing will now be discussed with reference to FIG. 2. Controller Port Target LUN (PTL) addressing is the process by which the controller selects storage space within a specific physical storage device. This type of addressing can be illustrated by the structure shown in FIG. 2. The SCSI bus 26 attached to the device port 28 connects the controller 14 to the SCSI-2 devices 34 of the physical storage media 32. This SCSI bus may be referred to as the "device side" SCSI bus, as already indicated, or the "back end" SCSI bus or device port. In the preferred embodiment, the maximum number of the device ports 28 supported in the device interface 30 is 6. Thus, the device ports 28 are numbered 1 through 6 as shown. The I/O devices 34, numbered 0 through 6, correspond to device side SCSI IDs 0 through 6, respectively. In the preferred embodiment, the controller uses device side SCSI IDs 6 or 7. This assignment is dependent upon the physical slot location of the housing in which the controller is installed. In a dual-redundant controller configuration, one controller has a device side ID of 6 and the other a device side ID of 7. These device side IDs are used to communicate between the controller and the devices on the device side SCSI bus. Each ID identifies a unique device on one of the device side buses 26.

The addressing process takes place in 3 steps: 1) port selection; 2) target selection; and 3) LUN selection. In the first step, the controller selects the SCSI-2 bus (via its corresponding port 28) connected to a particular device which needs to be accessed. In the example shown in FIG. 2, the port selected is port 6. In the second step, the controller selects the device's SCSI ID (or target) on that port (SCSI bus). If device 0 is the device to be accessed, then the controller selects SCSI ID0 on port 6. In the third step, the controller selects the desired logical unit number or "LUN" within that physical device. In the implementation of the preferred embodiment, there is only one LUN on each device and that LUN is always zero. Thus, controller PTL addressing is always tied to a particular physical storage device. It should be noted that, from a user's perspective, the device side target ID is only used when configuring devices on the controller.

Figure 3:
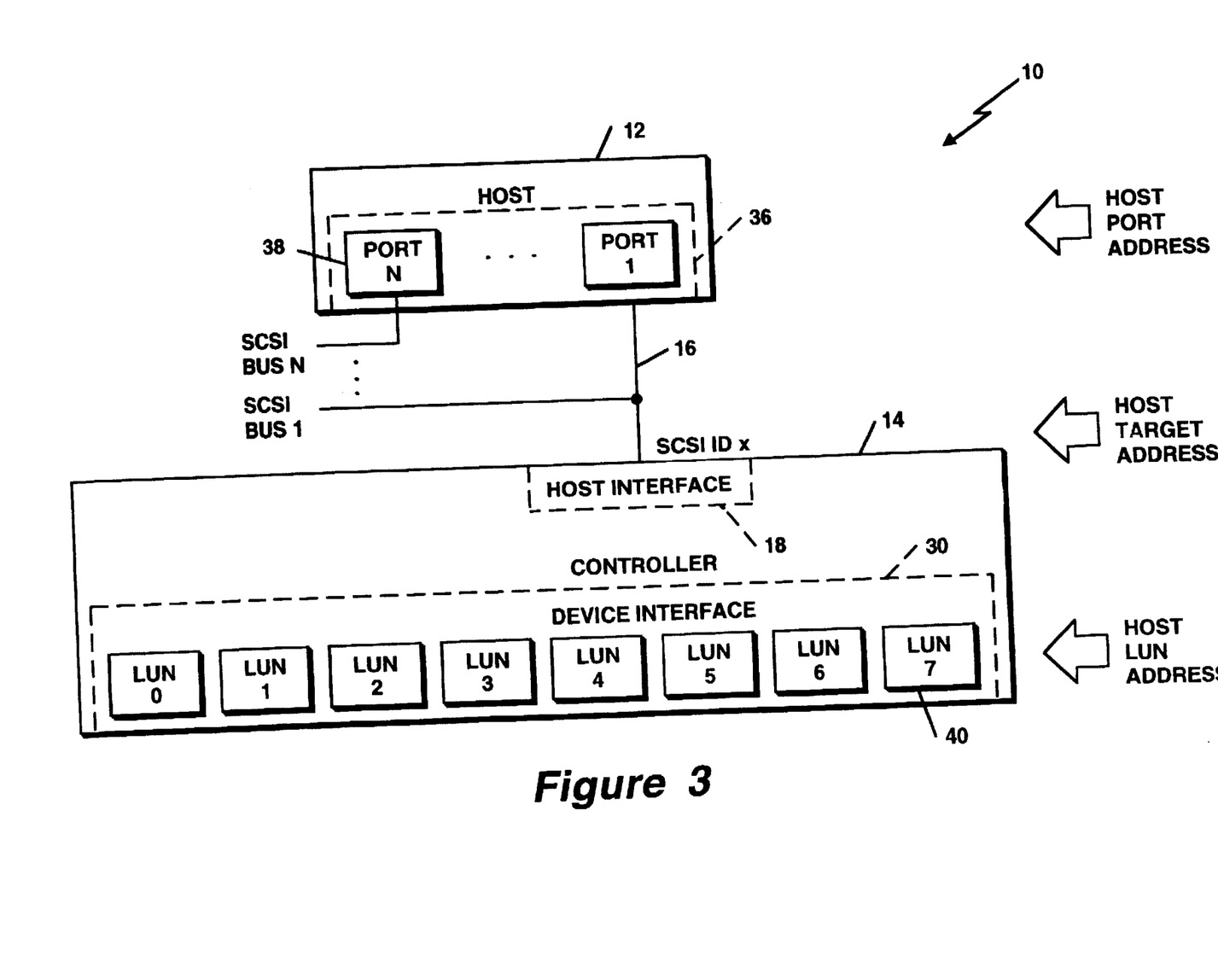
FIG. 3 is a block diagram illustrating storage device addressing from the perspective of the host CPU shown in FIG. 1.

Host storage addressing for computer system 10 is illustrated in FIG. 3. A typical host device interface 36 in host CPU 12 includes host ports 38, numbered 1 through N. Each host port 38 in the host device interface 36 is connected to one of host side SCSI buses 16—also known as "front end" buses—containing devices. From the perspective of the host CPU 12, the controller 14 is one of these devices. The controller is connected to the host side SCSI bus 16 at its host port or host interface 18 and has a corresponding host side SCSI ID (also known as a SCSI "target" ID), and contains up to eight devices. Thus, to support certain high-level storage subsystem functions, such as RAID, the controller 14 presents the entire physical device configuration (from the controller device interface 30 down to the physical device level) to the host CPU 12 as a group of host logical units (LUNs) 40. The host logical unit 40 usually consists of storage data being distributed throughout more than one physical device (as with a RAIDset). The controller presents these logical units to the host as individually addressable, virtual devices. The user configures the host logical units. Controller LUNs and host LUNs may represent the same structure, but this is often not the case, since RAIDsets (as well as stripesets and mirrorsets) cannot be configured in such a one-to-one relationship.

In the preferred embodiment, the controller 14 in nonredundant configuration can be assigned up to four host side SCSI target IDs on the host side SCSI bus. These IDs can be any ID number between 0 and 7; however, the SCSI ID of the host (or host adapter) is also on this bus. Thus, the controller's host side SCSI ID must be must be different from the host's ID. Typically, the host ID is 7, but it can be configured by the user to be something other than 7. The controller's host side IDs are set by the user, who accesses this configuration information through the maintenance terminal connected to that controller. A dual-active, redundant pair can also have up to four SCSI target IDs between them. That is, they share the same four IDs.

The host CPU 12 thus sees and addresses the physical storage media through the host LUNs 40. Although they share the same name, controller LUNs and host LUNs are logical addresses for two different storage structures. Controller LUNs exist only on the controller's device interface 30, and SCSI host LUNs exist only on a SCSI host's device interface 36. They may represent the same structure, but only if the user configures up to 8 controller devices in a one-to-one relationship with the host. This situation rarely occurs under normal operations.

Therefore, the host storage addressing is the process by which a SCSI host CPU selects a host logical unit made up of physical devices connected to a SCSI controller. First, if the host is connected to more than one adapter (not shown as a separate functional component in FIG. 3), the host selects an adapter with one or more SCSI-2 buses. Second, the host CPU selects the host side SCSI-2 bus that has the controller connected to it, if there are two or more SCSI-2 host interfaces. Third, the host CPU selects one of the controller's host side SCSI target IDs on that port (bus). Lastly, the host CPU addresses the controller with the LUN of the desired host logical unit. Thus, the target ID and host LUN are specified by the host CPU in accessing a "unit". The controller translates the host LUN into the physical addresses required to allow the host access to the virtual device represented by the host LUN.

Figure 4:
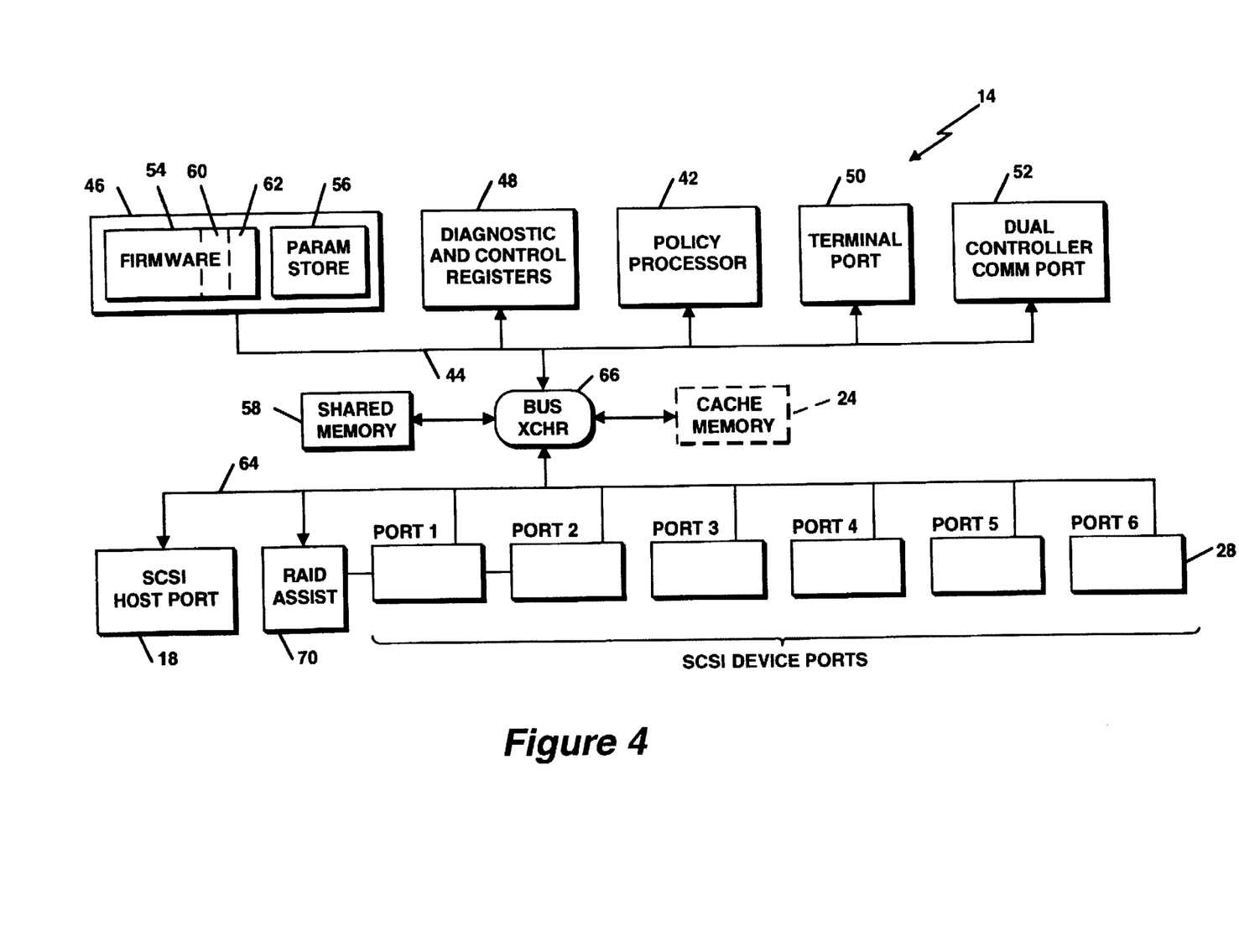
FIG. 4 is a simplified block diagram of an individual one of the storage controllers shown in the dual-active, redundant pair of FIG. 1.

A preferred implementation for the storage controller 14 (from FIG. 1) is illustrated by the block diagram shown in FIG. 4. The storage controller 14 bridges the host side SCSI bus 16 via the SCSI host port 18 to one or more of the device side SCSI buses 26 attached to corresponding SCSI device ports 28. Referring to FIG. 4, the storage controller 14 further comprises a policy processor 42, which controls all but the low-level device and host port operations. Sharing a native bus 44 used by the policy processor are a nonvolatile memory 46, diagnostics and control registers 48, a maintenance terminal port 50 and dual controller or communications port 52. The nonvolatile memory 46 holds controller firmware 54 as well as parameter information 56 entered by the user and by the controller software. Typically, the portions of the nonvolatile memory storing these components are physically implemented in separate memory devices. Part of the firmware (i.e., boot diagnostics) executes from the nonvolatile memory, but the majority of the diagnostics, and all of the functional code and utilities are actually run by the policy processor from a shared memory 58. The shared memory 58 includes buffer memory and memory control support logic. The firmware is copied from the nonvolatile memory 46 to the shared memory 58 by the boot diagnostics each time the controller boots.

The sections of the firmware most pertinent to a discussion of the present invention include user interface/configuration manager 60 and Failover Communications ("FOC") or failover support 62. The user interface/configuration manager 60 allows responses to most management functions and provides the user with the capability of adding and deleting devices, storagesets (RAID or other), and logical units. A "storageset" refers collection of containers, such as stripeset, RAIDset or mirrorset, that together make up the separate container. A "container" describes any entity that is capable of storing data, whether it is a physical device or group of devices. Physical devices are thus added by specifying a device type, a device name and a SCSI location. The device type is the type of device to be added, e.g., disks. Device name refers to that device and is referenced when creating units or storagesets. The SCSI location is the controller's PTL address for that device. Storagesets are added in a similar manner. The devices and/or storagesets must be initialized prior to using them for host units. Units that use either the devices directly or the storagesets built from the devices directly are added by specifying the host LUN and container name.

Further, the user interface/configuration manager 60 enables the user to set and review controller configuration information, such as controller ID. To place the controller in a dual-active, redundant controller configuration, the configuration parameters must be set up at initialization time. Configuration information is entered by the user at the maintenance terminal 20 (from FIG. 1) connected to the maintenance terminal port 50 and stored in the nonvolatile memory 46. It includes the total number of SCSI target IDs. Up to four unique SCSI target IDs may be specified in any combination between the controllers for a dual-active, redundant controller configuration. This allows support for up to 32 logical units (LUNs), 8 host LUNs per target. To set the preferred paths to balance the load and improve performance, preferred path qualifiers to define which target IDs are assigned to each controller. For equal sharing of resources, each controller is assigned two unique and "preferred" IDs; however, the invention is not so limited. If preferred IDs are not specified for one of the controllers, that controller will not respond to any target ID on the host's SCSI bus. However, in a dual-redundant configuration, if the controller with set preferred IDs fails, the controller with no preferred IDs will still take over the targets of the failed controller.

Figure 6:
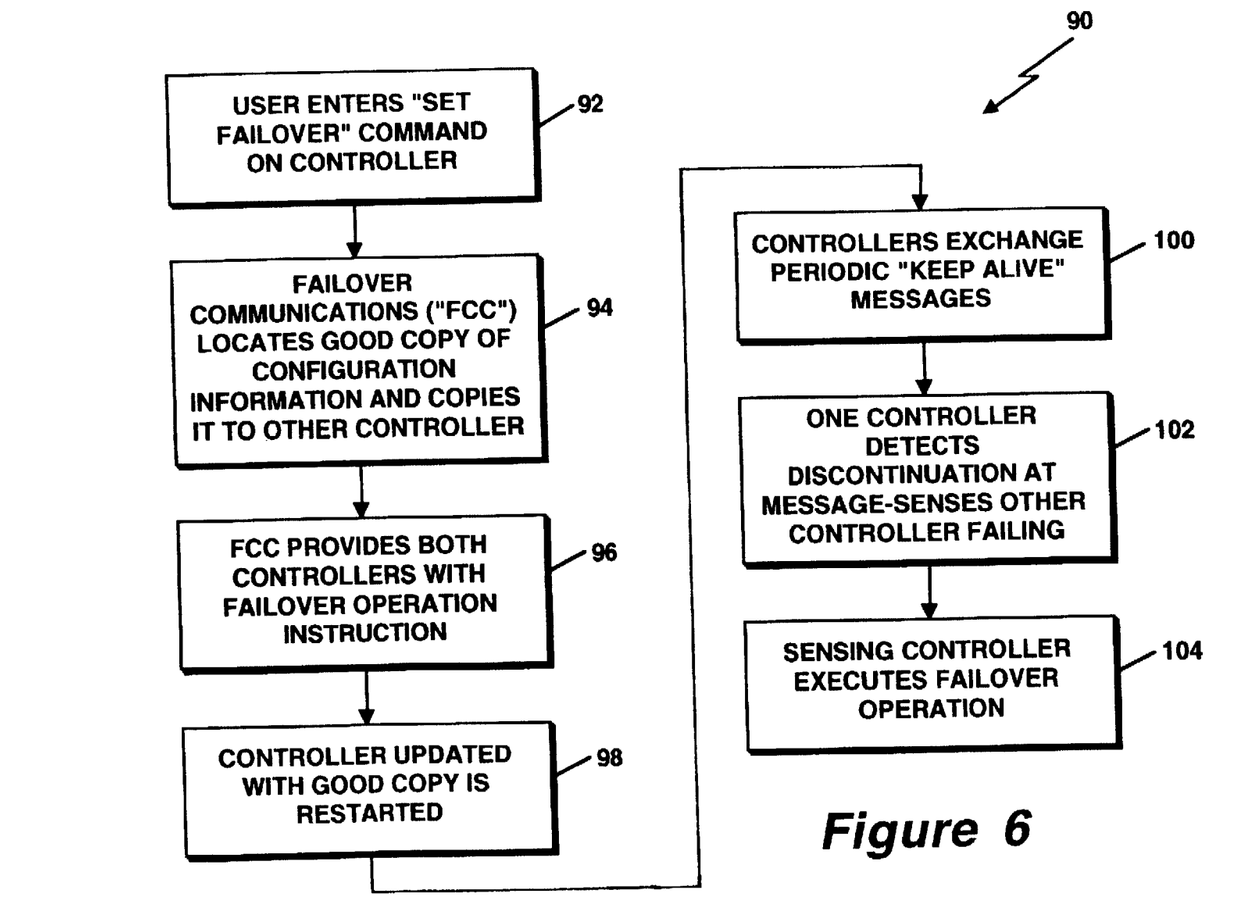
FIG. 6 is a flow diagram illustrating the method by which a pair of tightly coupled controllers are placed in dual-active, redundant (failover) configuration and subsequent steps performed in support of the host transparent failover operation.
Figure 7A:
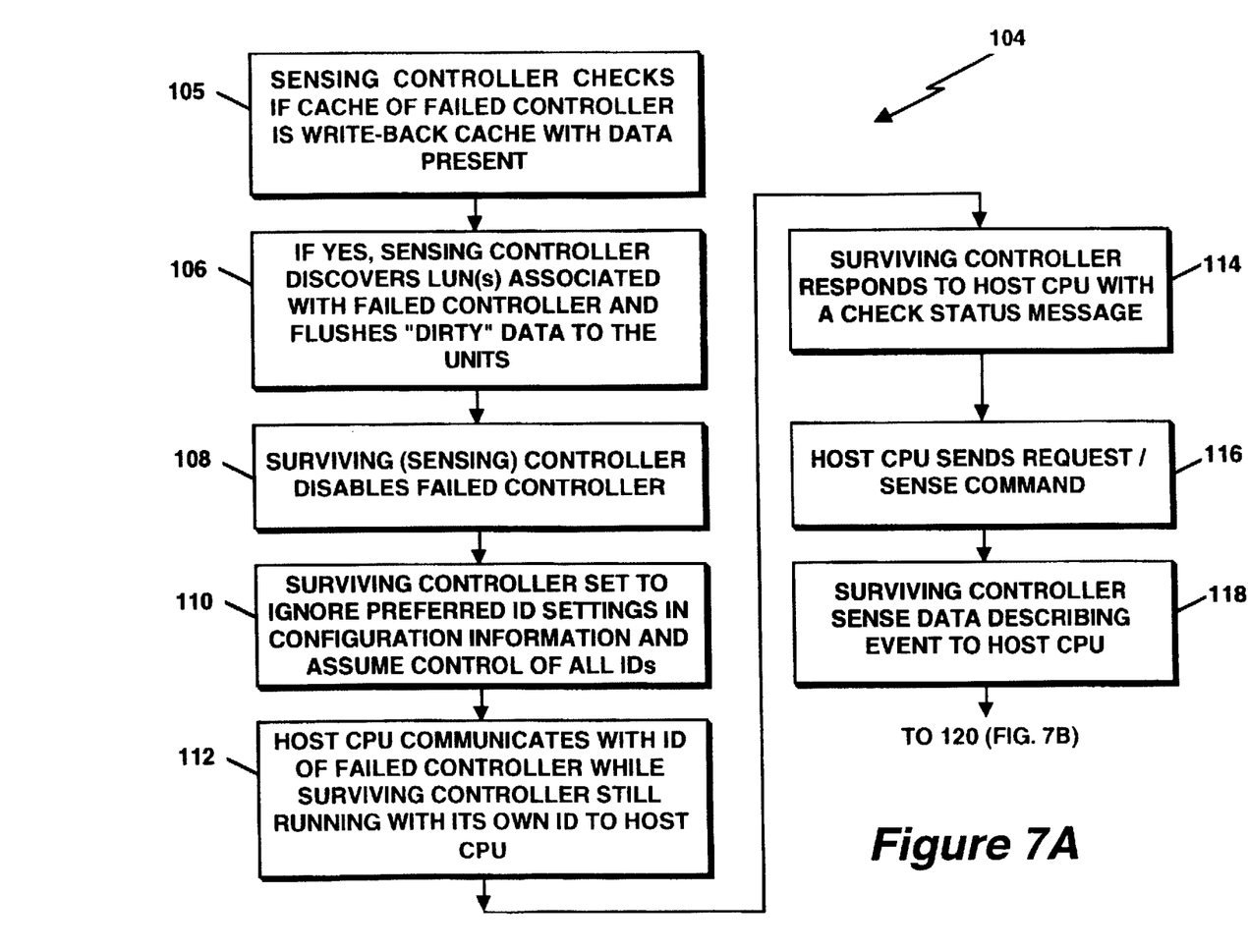
FIGS. 7A–B are flow diagrams illustrating the detailed steps of the host transparent failover operation according to the present invention.
Figure 7B:
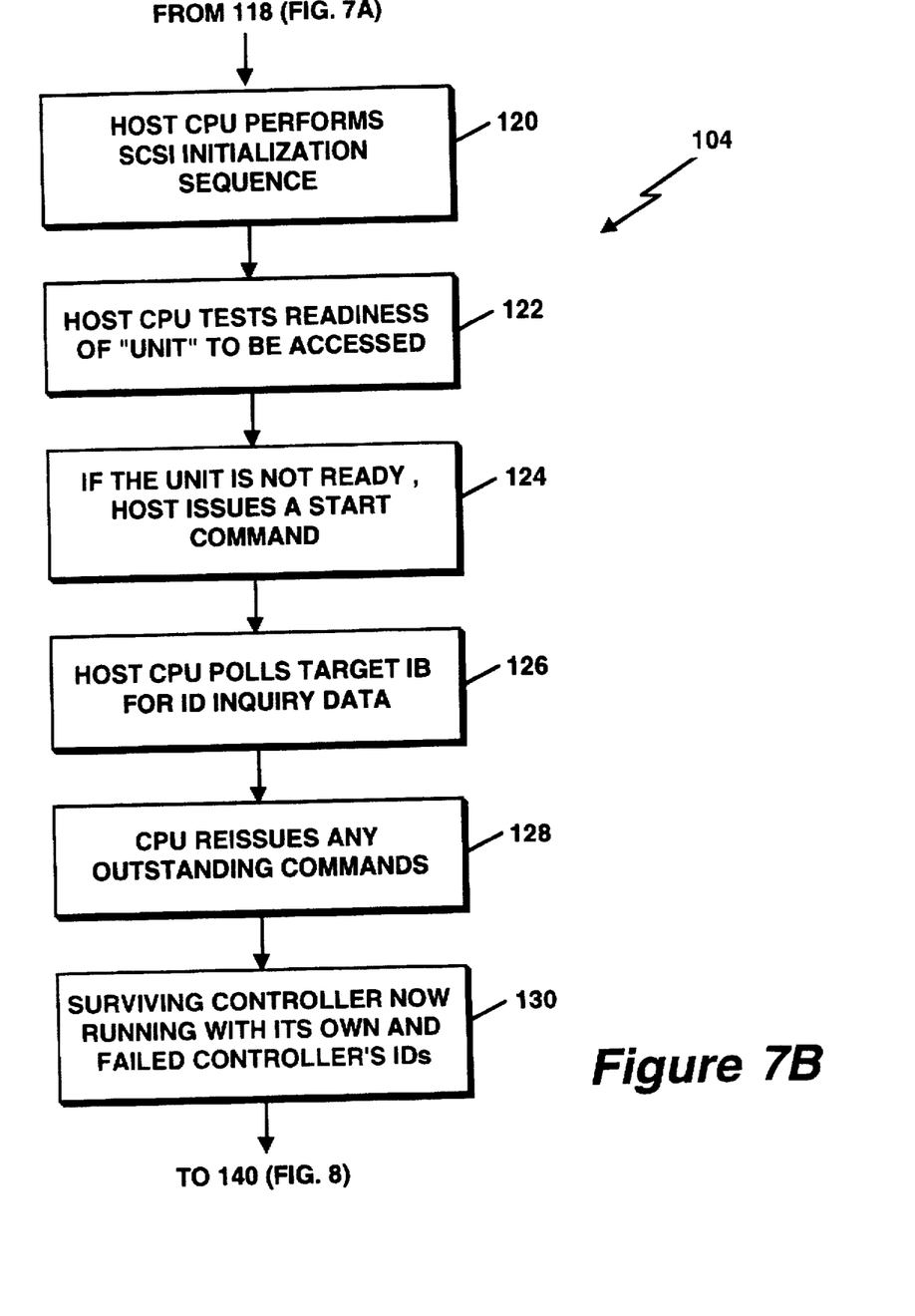
Figure 8:
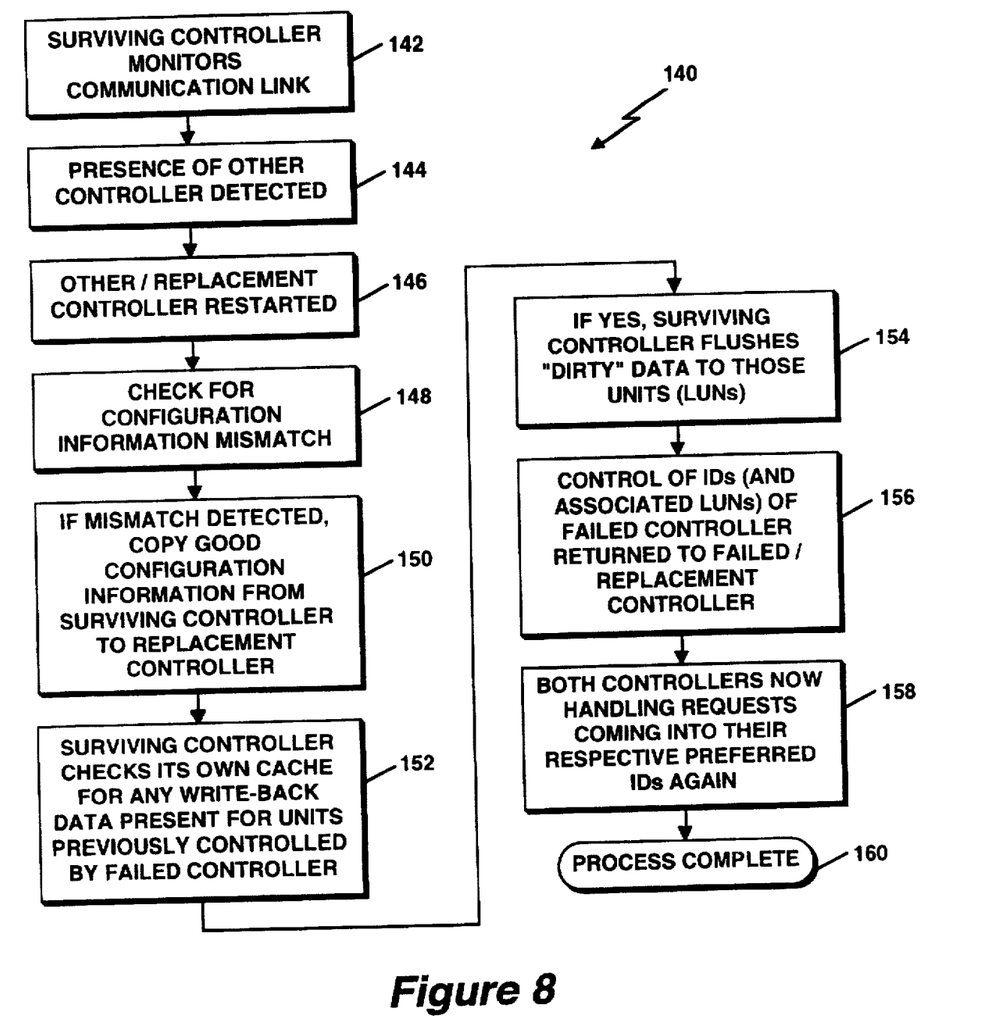
FIG. 8 is a flow diagram illustrating the steps of the host transparent failback operation according to the present invention.

The failover support 62 in the firmware 54 runs in each controller, sending messages about configuration changes between the controllers along with periodic, operational status or "keep alive" messages to let each controller know the other is running. If a controller fails, the surviving controller will physically disable the failed controller. The failover function will be described more fully when FIGS. 6–8 are discussed in detail.

Resuming the storage controller description and still referring to FIG. 4, the cache 24 (from FIG. 1) is shown in dashed lines, as it is implemented as a separate module in the preferred embodiment. Alternately, it could be located on the same module as the controller. Thus, it can be considered part of the controller function, although it is located on a separate module. Moreover, the controller need not include a cache in order to take advantage of the present invention. Most modern storage controllers do incorporate a cache to enhance memory performance. If cache is employed, its design may utilize either a write-through or write-back caching policy. The separate buses containing the shared memory 58 and the cache 24 are interconnected to the native bus 46 and an internal device port access bus 64 for accessing the host port 18 and SCSI device ports 28 via a bus exchanger 66. The bus exchanger is a crossbar which provides fast access by all entities to all parts of the controller. The host port 18 may be implemented as a fast-wide differential SCSI-2 interface, using commercially available SCSI I/O processors and SCSI differential drivers. A SCSI I/O processor, having internal storage available to store binary-encoded ID values for the SCSI IDs, thus allows the controller to assume more than one host side SCSI bus address or ID. The SCSI device ports 28 can also be implemented by coupling commercially available SCSI port processor chips, which execute scripts read from the shared memory 58 under the control of the policy processor 40, with SCSI transceivers. Also residing on bus 64 is a RAID assist component 70, which accelerates RAID operations such as parity RAID parity calculations and host data compare requests.

Figure 5:
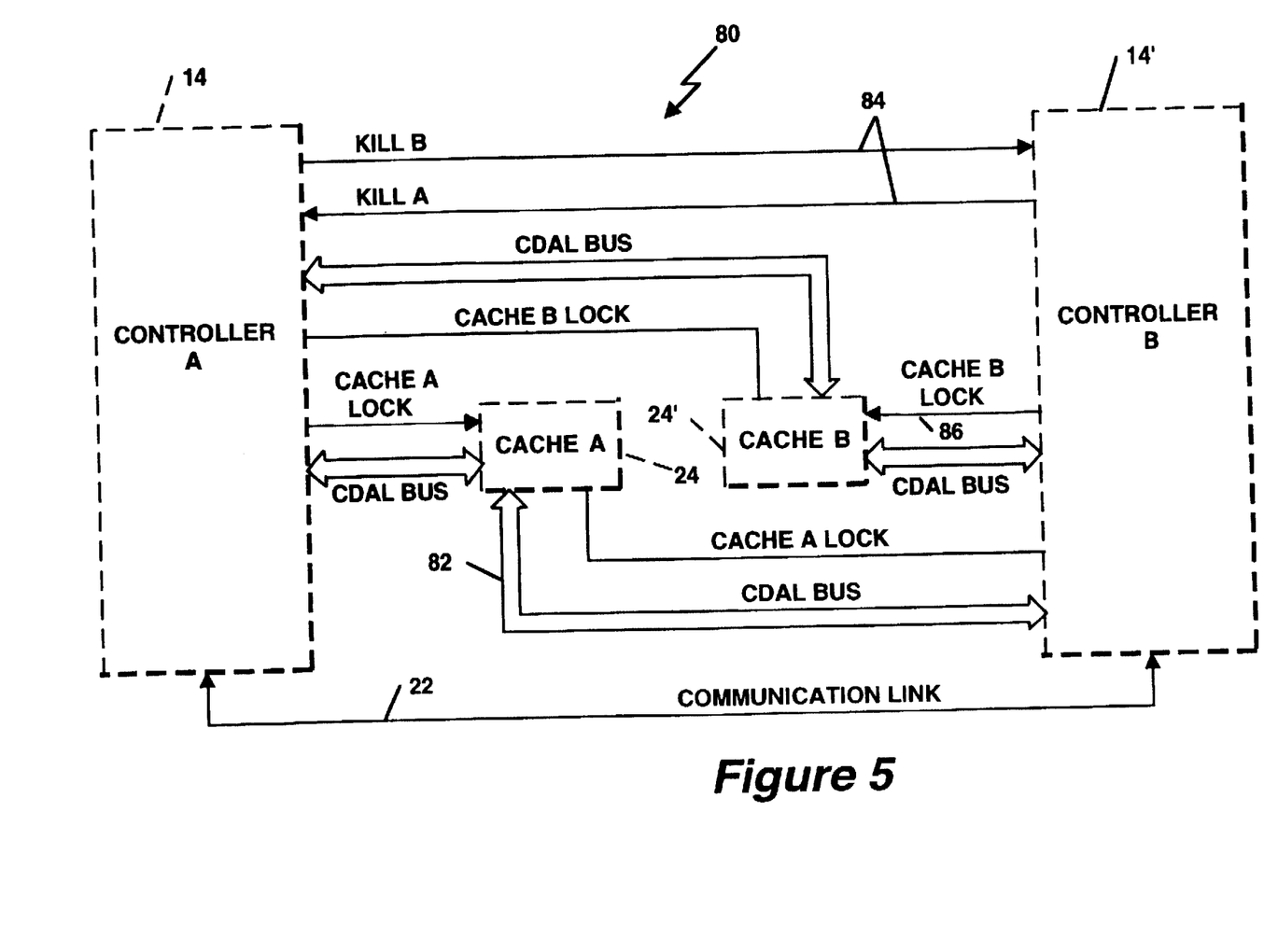
FIG. 5 is a block diagram of the dual-active, redundant pair of storage controllers, each as individually depicted in FIG. 4, further illustrating the intercontroller communication therebetween.

FIG. 5 depicts the intercontroller communications interface 80 utilized by the storage controllers 14, 14' (shown here, along with their respective caches 24, 24', in dashed lines) in dual-active, redundant configuration during failover and failback operations. The interface between the controllers includes the communication link 22, implemented by means of a serial communication universal asynchronous receiver/transmitter (UART) on each controller. This communication link is used by each controller to send "keep alive" messages to the other controller. It is also used by the controllers to inform each other about the configuration information. The interface further includes CDAL buses 82, which are the data and addresses buses, as well as control signals, for accessing the caches. Not shown but also included are other signals which relate to the current state of the configuration and to specific control lines that determine the operation of the dual-active, redundant pair. These state and control signals are used by each controller to sense the presence or absence of the other controller in a dual-active redundant configuration and the status (e.g., presence or absence) of the other controller's cache, in addition to its own.

The controller interface also includes a pair of disabling or "KILL" signals 84. Each controller has the capability to assert an associated one of the KILL signals, thereby disabling the other controller. The KILL signal thus ensures that a failed or failing controller will not create the possibility of data corruption to or from attached devices. A controller asserts the KILL signal when the other controller sends a direct message that it is failing or when the "keep alive" communication over the communication link 22 ceases.

Also part of the interface are cache lock signals 86. These signals control access to the caches 24, 24'. This cache lock mechanism limits cache access by preventing one controller from accessing the cache being used by the other, but enabling such access when the other controller has failed.

The failover support 62 (from FIG. 4) will now be described in detail with reference to FIGS. 6–8. As already indicated, the failover support firmware process is executed when one controller in a dual-active, redundant controller configuration malfunctions. In a failover configuration, information is shared between the two controllers. This type of information includes storageset names (e.g., mirrorsets, RAIDsets and stripesets), actual device configuration and association to named storagesets and logical unit definitions. Both controllers in the dual-active redundant pair have knowledge of each other's SCSI target IDs, but do not share them. All changes in container configuration are automatically communicated between the two controllers. Prior to failover, the resources are always accessible only to a particular controller because the controller is a SCSI target of the host, and host LUNs must be visible through a single target ID. This is true whether or not a unit is currently interacting with the host.

FIG. 6 illustrates the steps which are necessary to and also performed subsequent to placing the controllers in the dual-active, redundant configuration which utilizes the failover support 90. First, the user enters a SET FAILOVER command 92. The FailOver Communications ("FOC") responds to this command by locating a "good" copy of the configuration information and by copying that good copy, which was previously entered into one of the controllers and may or may not have been copied to the other controller up to this point, from that controller to the other controller 94. The location of the copy is specified in the command. The FOC then provides each controller with a failover instruction 96. Each controller is instructed to take over for the other controller in the event that a failure on the part of the other controller is detected. Thus, any devices and/or cache currently attached to the failed controller will automatically become available and accessible through the operating or surviving controller when the failover operation is thus triggered. For dual-active, redundant configuration, the SET FAILOVER command need be entered on one controller only.

That controller which has been updated with the good copy of the configuration information is automatically restarted after the SET FAILOVER command has been entered 98. Thus, although not shown in FIG. 6, it is important for the user to ensure that the cache of this controller has no cache errors or unwritten cache prior to the failover command being entered. After failover takes place, the surviving controller need not be removed from failover configuration unless configuration changes are made before the failed controller is replaced.

Therefore, the two controllers, which are connected to the same host SCSI-2 bus as shown in FIG. 1, are now ready to resume normal operation as a dual-active, redundant pair with transparent failover capability. As previously described with reference to FIG. 4, each controller may be configured to have multiple SCSI target IDs. In the preferred embodiment, the dual-redundant controller configuration may have up to four IDs in any combination between the two controllers; however, the invention need not be limited to four. Each controller in the failover configuration has a record of the configuration information, but services only the targets it has been assigned (and as designated by the preferred path qualifiers in the configuration information) until a failover operation is triggered by the detection of a failure on the part of one controller in the failover configuration.

As previously discussed with reference to FIG. 5, the controllers of the dual-active, redundant pair of controllers establish and subsequently maintain communication over communication link 22 through the use of periodic status checks. Returning to FIG. 6, the controllers thus send each other "keep alive" messages 100 and monitor this line to detect a discontinuation in the transmission of these messages by the other controller 102. If such a discontinuation is sensed, the sensing controller executes the failover operation as instructed 104.

FIGS. 7A and B illustrate in detail the failover operation 104 from FIG. 6. The sensing controller's first action is to determine if the failed controller's cache is a write-back cache with data present 105 and, if it is, discover the LUNs associated with the failed controller and flush any present "dirty" data to those units 106. Note that this step is performed only if the failed controller utilizes a cache and that cache is a write-back cache. Next, the sensing controller (hereinafter, also referred to as the "surviving controller") disables the failing controller by locking the failing controller out of any further system control 108. To accomplish this task, the surviving controller asserts the KILL signal described with reference to FIG. 5. The surviving controller now assumes control of the failing controllers target IDs, ready to service all of the targets (i.e., the targets of both of the original controllers) by ignoring the preferred path settings in the configuration information 110.

Thus, the failover operation is executed in its entirety at the controller level, occurring in a manner completely transparent to the host CPU. As long as the redundant controllers reside on the same SCSI bus, the host CPU need not be involved. Although the host CPU is not involved in the execution of the failover, it is aware that some event has occurred as there is a timeout in response to any commands sent to the failing controller's target ID or target IDs. This timeout is the only indication to the host CPU that a fault of some kind has occurred. The outstanding requests are "lost", as they do not get conveyed to the surviving controller; however, the host CPU keeps a record of the "lost" requests.

In the preferred implementation, the transparent failover process simulates a POWER FAIL situation. The failover action appears to the host CPU as a power failure, in which there is normally a complete controller system reinitialization. When it appears to the host CPU that the reinitialization is complete (i.e., the failed controller's ID or IDs appear to be back "online"), the host CPU resumes communications with the target IDs of the failed controller 112. All the while, the surviving controller is still running with its own ID or IDs to the host CPU. In response to host CPU communications to an ID of the failed controller, the surviving controller sends the host CPU a check condition status 114. The check condition status indicates to the host CPU that a problem or exception condition has occurred. The host CPU then sends a response to check condition status by sending request/sense command requesting information 116. Sense data describing a power on and reset event is subsequently sent by the surviving controller 118. With reference to FIG. 7B, the host CPU now believes that the target ID lost power momentarily and is forced to go back through a SCSI initialization sequence 120. Once the initialization has completed, the host CPU is ready to re-issue any outstanding SCSI commands to a given LUN or unit associated with the failed controller. First, however, the host CPU tests the readiness of the unit 122. If the unit is not ready, the host CPU needs to issue a start command to make the unit ready on the SCSI bus 124. The host CPU also wants to ensure that it is still communicating with the same target device that it was communicating with prior to the "power failure". At minimum, it will poll the target device for ID inquiry data describing that device 126. Finally, the host CPU reissues any outstanding commands issued to that target ID 128. The surviving controller is now running with the IDs of both the surviving controller and the failed controller 130. Therefore, "normal" operations resume until such time as a failback operation occurs.

FIG. 8 illustrates the detailed steps of a failback operation 140. The surviving controller monitors the status of the failed controller via the communication link 142. Once the failed controller has been replaced with a repaired or new controller and its replacement re-establishes communication with the surviving controller through the serial link, the surviving controller detects the presence of the replacement controller 144. Subsequently, the replacement controller is restarted 146.

AS previously indicated, the controller configuration information is stored in nonvolative memory on the controller. Thus, when the failed controller is replaced, the replacement controller's configuration contents will not match that of the surviving controller. When the replacement controller is restarted, a check for a configuration information mismatch is performed 148. If a discrepancy is therefore detected, the restarted controller will not recognize or access any devices. It is essentially disabled until the known good configuration from the surviving controller is copied to the replacement controller 150. In further preparation, the surviving controller checks the cache (if any) being used by the surviving controller for any write-back data present for units or LUNs previously controlled by the failed controller. If such data is present, it is flushed to appropriate LUN(s) originally owned by the failed controller and currently controlled by the surviving controller so that the cache is not holding any unwritten data when control is turned over to the replacement controller 154. Now, the surviving control returns the control of the failed controller's target IDs and associated LUNs to the replacement controller 156. Both controllers are handling requests coming into their preferred IDs again and failback is therefore complete 158.

Although a transparent failover operation occurring in response to a sensed controller failure as been described, the transparent failover operation can also be invoked by operator action. For conditions not related to or directly resulting in a sensed failover, a user may want to remove and replace a single failed controller or cache that is part of a redundant pair. Although the failover is forced by the user in this instance, the failover operation will occur in much the same manner as that described.

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed:

1. A method of performing a failover process in a computer system having a pair of storage controllers, each storage controller of the pair coupled to the other storage controller by a communication link and connected to a host CPU by a SCSI bus, each storage controller having units associated therewith, comprising the steps of:

placing the storage controllers in a dual-active redundant configuration, where in each controller serves one or more preferred SCSI IDs;

sensing by one of the controllers in the dual-active redundant configuration that the other has failed;

determining whether or not the failed controller has a write-back cache associated therewith;

if the failed controller has an associated write-back cache, then discovering the units associated with the failed controller and flushing data present in the write-back cache to the units;

disabling the failed controller;

assuming control of the one or more preferred SCSI IDs of the failed controller by the surviving controller, whereby the surviving controller is capable of servicing the SCSI IDs of both of the controllers;

upon receiving communications from the host CPU to a target ID of the failed controller, sending by the surviving controller to the host CPU a check condition status message;

in response to the check condition status message, sending by the host CPU a command requesting information;

sending sense data describing a power on and reset event by the surviving controller to the host CPU;

initiating by the host CPU a SCSI initialization sequence;

upon completion of the initialization sequence, performing readiness testing by host CPU of a unit to be accessed;

if the unit is not ready, issuing a start command to make the unit ready on the SCSI bus;

verifying the identity of the target ID;

reissuing any outstanding commands to the target ID; and servicing of the reissued commands by the surviving controller.

2. A method of performing a failback process in a computer system having a pair of storage controllers in a coupled configuration, wherein one of the storage controllers has failed, each storage controller of the pair coupled to the other storage controller by a communication link and connected to a host CPU by a SCSI bus, the surviving storage controller having IDs and units associated therewith, comprising the steps of:

monitoring by the surviving one of the controllers the status of the failed controller;

detecting by the surviving controller when the failed controller has been replaced with a replacement controller, the replacement controller reestablishing communications with the surviving controller over the communication link;

restarting the replacement controller;

checking for a configuration information mismatch between the surviving controller and the replacement controller by comparing configuration information stored in the replacement controller to configuration information stored in the surviving controller;

if a mismatch is detected, then copying the configuration information stored in the surviving controller to the replacement controller;

determining whether or not the surviving controller has any write-back cache data for one or more of the associated units that were owned by the failed controller prior to failure;

flushing the write-back cache data to the one or more of the associated units; and returning control of the one or more of the IDs and associated units belonging to the failed controller prior to failure to the replacement controller.

3. A method of performing a failover process in a computer system having a pair of storage controllers, each storage controller of the pair coupled to the other storage controller by a communication link and connected to a host CPU by a SCSI bus, each storage controller having units associated therewith, comprising the steps of:

placing the storage controllers in a dual-active redundant configuration, wherein each controller serves one or more preferred SCSI IDs;

sensing by one of the controllers in the dual-active redundant configuration that the other has failed;

disabling the failed controller; and assuming control of the one or more preferred SCSI IDs of the failed controller by the surviving controller, whereby the surviving controller is capable of servicing the SCSI IDs of both of the controllers.

4. A method of performing a failover process in a computer system according to claim 3, further comprising the steps of:

sending by the surviving controller to the host CPU a check condition status message upon receiving communications from the host CPU to a target ID of the failed controller;

in response to the check condition status message, sending by the host CPU a command requesting information;

sending sense data describing a power on and reset event by the surviving controller to the host CPU;

initiating by the host CPU a SCSI initialization sequence;

upon completion of the initialization sequence, performing readiness testing by host CPU of a unit to be accessed;

if the unit is not ready, issuing a start command to make the unit ready on the SCSI bus;

verifying the identity of the target ID;

reissuing any outstanding commands to the target ID; and servicing of the reissued commands by the surviving controller.

* * * * *